J. J. CARNEY.
WHEEL HUB.
APPLICATION FILED JUNE 29, 1914.

1,187,257.

Patented June 13, 1916.

Witnesses

Inventor
J. J. Carney
By
His Attorneys

UNITED STATES PATENT OFFICE.

JAMES J. CARNEY, OF HAVERHILL, MASSACHUSETTS.

WHEEL-HUB.

1,187,257.  Specification of Letters Patent.  Patented June 13, 1916.

Application filed June 29, 1914. Serial No. 847,921.

*To all whom it may concern:*

Be it known that I, JAMES J. CARNEY, a citizen of the United States, and resident of Haverhill, in the State of Massachusetts, and United States of America, have invented certain new and useful Improvements in Wheel-Hubs, of which the following is a full, clear, and exact description.

This invention relates to improvements in vehicle wheel hubs, and the object is to provide a hub particularly adapted for use on axles equipped with the lubricating device, shown and described in my former Patent No. 1,051,081, and in my application, Ser. No. 844,011.

A further object is to provide means for excluding all dust and grit from the lubricant, and yet to provide for lubrication of the wheel without removal of such dust excluding means.

A still further object is to provide a device of simple and durable construction, which will strengthen and support the hub.

Various other objects and advantages will be apparent from the following description.

The device consists essentially of a dust cap located entirely inside the outer collar of the hub, and so designed as to materially support this collar. The cap may be carried by the hub or by the axle nut as desired, and a suitably located opening is provided for the introduction of lubricant by means of a grease gun, without it being necessary to remove the cap.

Figure 1:
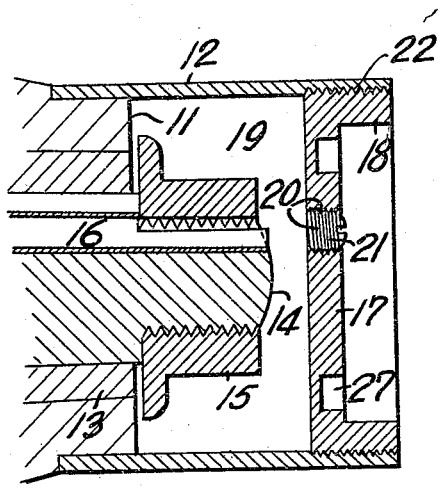
Figure 3:
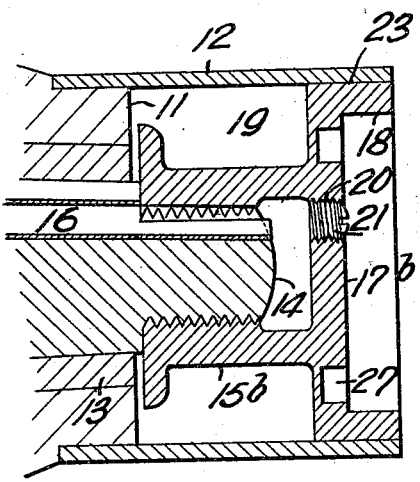
Figure 2:
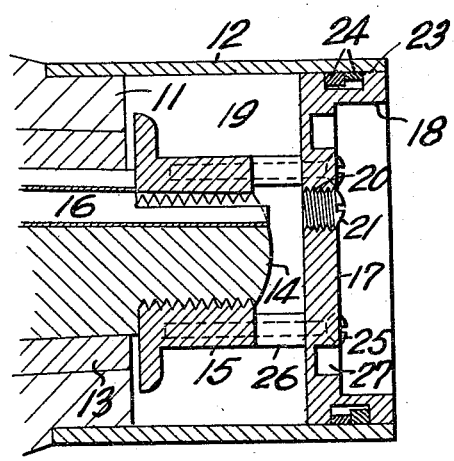
Figure 4:
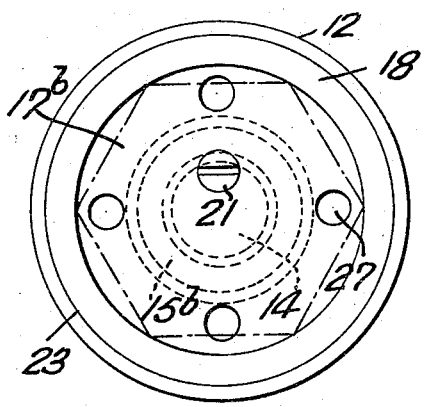
Figure 5:
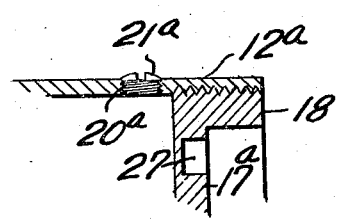

In the drawings which illustrate the invention:—Figure 1 is a fragmentary longitudinal sectional view through the center of the hub, showing the simplest form of the device. Fig. 2 is a similar view showing the cover plate attached to the axle nut. Fig. 3 shows the nut and plate formed integral. Fig. 4 is an end elevation of the device shown in Fig. 3. Fig. 5 is a fragmentary sectional view showing an alternative location of the lubricating aperture.

Referring more particularly to the drawings, 11 designates a hub having an outer collar or band 12, and a lining sleeve 13, in which the axle 14 bears. The end of the axle is threaded to receive a nut 15 arranged to bear against the end of the sleeve 13 and hold the wheel on the axle. The axle may be lubricated in any suitable way such as by means of the lubricating tube 16, fully shown and described in my Patent No. 1,051,081 and application, Ser. No. 844,011, which preferably projects entirely through the nut, so that access may be had to the tube without the necessity of removing either the nut or wheel from the axle.

The collar 12 is made to project beyond the nut, as clearly shown, so as to protect the nut. It is common practice to secure a light dust cap to the end of this collar to prevent an accumulation of dust and grit within the collar. Such dust caps, however, are comparatively unsubstantial and become crushed and useless with a very slight knock. These caps do not support the collar, and if the collar becomes bruised, the dust cap is generally rendered useless by the damage to its threads. According to the present invention, a dust cap 17 is provided in the form of a very substantial plate provided with a heavy peripheral flange 18. This plate and flange are located entirely inside the collar and do not project beyond the end thereof. The heavy plate and its flange so support the collar that bruising of the same becomes impossible or difficult except in serious accidents. No part of the plate or its flange projects beyond the end of the collar, so that there is nothing to catch and injure or be injured by passing objects.

The dust cap thus closes a chamber 19 in which a lubricant may be confined. The operation of removing the dust cap to insert a lubricant in this chamber is sometimes inconvenient, and a small aperture 20 is provided having a closure plug 21. When the plug is removed, the nozzle of a grease or oil gun may be inserted, and the chamber 19 squirted full of lubricant. The operation is thus performed in a more cleanly way and without loss of time, and furthermore much thinner lubricants may be used than is possible when the cap requires removal to insert the lubricant. The aperture 20 and plug 21 may be formed at any suitable point in the cap, for example, in line with the end of the lubricating device 16, as shown in Fig. 1, or this filling aperture may be provided in the collar 11 itself, as shown in Fig. 5, the parts being distinguished from those already defined by the addition of letter "a".

The dust cap or plate 17 may be attached in any suitable way, either by the ordinary method of screw threading to the collar 12, as shown at 22, or by attachment to the nut 15, as shown in Fig. 2. In this form, the periphery of the plate and its flange are without threads, so as to form a smooth bearing surface 23 working against the inner surface of the collar 12. One or more expansive rings 24 may be provided, if desired, to make a perfectly tight joint between the collar and plate. The plate is mounted on the nut by means of a suitable number of screws 25, and may be clamped close up to the nut or spaced away therefrom by means of fillers 26. In the form shown in Fig. 3, the nut and plate are formed integral, the nut portion being designated 15$^b$, and the plate portion 17$^b$. In this form, it will not be necessary to have the nut portion of polygonal form as the plate will serve to rotate the same. Whether the plate screws directly into the hub, as in Fig. 1, or is formed integral with the nut, as in Fig. 3 it will be necessary to provide recesses 27 in the plate or to make the inner surface of the flange polygonal, so as to coöperate with an inside wrench in the well known manner.

When the nut and plate are made integral, it is obvious that the construction is greatly simplified, the lubricant aperture 20 constantly maintained in line with the tube 16, and the hub itself greatly strengthened. An additional advantage is that the greater engaging surface between the plate and hub will keep the nut always tight, so that the same will not loosen and work off, as sometimes occurs when the nut engages only the end of the hub sleeve 13. It is obvious that the nozzle of the grease gun may be threaded if desired to coöperate with the threads of the aperture 20, so that lubricant may be inserted under considerable pressure without any leakage occurring around the nozzle.

Having thus described my invention, what I claim is:—

1. In a vehicle wheel and axle, a hub collar, a cup shaped nut for said axle, and a flange extending from said nut forming an integral continuation of the bottom thereof which extension forms a closure plate for the outer end of the hub collar.

2. In a vehicle wheel and axle, a hub collar, an elongated cup shaped nut for said axle, a flange extending from said nut forming an integral continuation of the bottom thereof which extension forms a closure plate for the outer end of the hub collar, the elongation of said nut forming an inclosed oil chamber for said axle, and a duct in said axle leading from said chamber.

3. In a device of the character described, the combination with an axle having a lubricant passage extending inwardly from the end thereof, of a hub mounted on the axle, means for retaining the hub on the axle, a collar on the hub projecting beyond the end of the axle, a cap located in the outer end of the collar having an opening therethrough registerable with the lubricant passage, and a removable plug closing the opening.

In witness whereof, I have hereunto set my hand, in the presence of two witnesses.

JAMES J. CARNEY.

Witnesses:
M. E. DELANEY,
WM. D. KEARNEY.

Copies of this patent may be obtained for five cents each, by addressing the "Commissioner of Patents, Washington, D. C."